(12) United States Patent
Makino

(10) Patent No.: US 9,191,609 B2
(45) Date of Patent: Nov. 17, 2015

(54) SEGMENT CREATION DEVICE, SEGMENT CREATION METHOD, AND SEGMENT CREATION PROGRAM

(75) Inventor: Masaaki Makino, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 309 days.

(21) Appl. No.: 13/614,880

(22) Filed: Sep. 13, 2012

(65) Prior Publication Data
US 2013/0007031 A1   Jan. 3, 2013

Related U.S. Application Data

(63) Continuation of application No. PCT/JP2011/005664, filed on Oct. 7, 2011.

(30) Foreign Application Priority Data

Nov. 24, 2010  (JP) .................................. 2010-261779
Sep. 28, 2011  (JP) .................................. 2011-213372

(51) Int. Cl.
*G06F 15/16*  (2006.01)
*H04N 5/76*   (2006.01)
(Continued)

(52) U.S. Cl.
CPC ................ *H04N 5/76* (2013.01); *G11B 27/034* (2013.01); *G11B 27/329* (2013.01); *H04N 21/2187* (2013.01); *H04N 21/4334* (2013.01); *H04N 21/4884* (2013.01); *H04N 21/8402* (2013.01);
(Continued)

(58) Field of Classification Search
CPC .................................................. H04L 12/1845
USPC ................................................. 709/231, 232
See application file for complete search history.

(56) References Cited

U.S. PATENT DOCUMENTS 5,561,457 A    10/1996  Cragun et al.
7,053,732 B2 *  5/2006  Zhou .............................. 333/156
(Continued)

FOREIGN PATENT DOCUMENTS

EP    2124443 A1    11/2009
JP    2004-364183 A  12/2004
(Continued)

OTHER PUBLICATIONS

Kyoko Ariyasu, "How to Generate Trackback between Text Comments and TV programs," FIT2007 Dai 6 Kai Forum on Information Technology Ippan Koen Ronbunshu, separate vol. 1, Ippan Koen Ronbun Model•Algorithm•Programming Software Hardware• Architecture, Aug. 22, 2007, pp. 153 to 154.
(Continued)

*Primary Examiner* — Karen Tang
(74) *Attorney, Agent, or Firm* — Venable LLP; Michael A. Sartori; Laura G. Remus

(57) ABSTRACT

A segment creation device includes: a live data acquiring unit that acquires character string data transmitted from a plurality of terminals, and acquires live data that includes the character string data and a data registration date and time; a condition input unit that causes a user to input a search condition including time zone information representing a predetermined time zone and character string information; a live data number counting unit that counts the number of pieces of live data having character string data; and a segment creating unit that creates segment data which is specified based on a starting time and an ending time of a time period.

5 Claims, 18 Drawing Sheets

(51) Int. Cl.

| | | |
|---|---|---|
| *H04N 21/2187* | (2011.01) | |
| *H04N 21/845* | (2011.01) | |
| *G11B 27/034* | (2006.01) | |
| *G11B 27/32* | (2006.01) | |
| *H04N 21/433* | (2011.01) | |
| *H04N 21/84* | (2011.01) | |
| *H04N 21/8405* | (2011.01) | |
| *H04N 21/488* | (2011.01) | |
| *H04N 5/765* | (2006.01) | |
| *H04N 9/82* | (2006.01) | |

(52) U.S. Cl.
CPC ....... *H04N 21/8405* (2013.01); *H04N 21/8456* (2013.01); *H04N 5/765* (2013.01); *H04N 9/8205* (2013.01)

(56) References Cited

U.S. PATENT DOCUMENTS

| | | | |
|---|---|---|---|
| 7,429,944 B1* | 9/2008 | Nairn | 341/155 |
| 7,590,130 B2* | 9/2009 | Homer et al. | 370/404 |
| 7,701,976 B2* | 4/2010 | Homer et al. | 370/474 |
| 8,056,086 B2* | 11/2011 | El-Mahdy et al. | 718/105 |
| 8,174,446 B2* | 5/2012 | Davis et al. | 342/387 |
| 8,472,484 B2* | 6/2013 | Sugai et al. | 370/516 |
| 8,498,350 B2* | 7/2013 | Stern et al. | 375/260 |
| 8,743,692 B2* | 6/2014 | Motwani | 370/235 |
| 2001/0004739 A1* | 6/2001 | Sekiguchi et al. | 707/100 |
| 2001/0015956 A1* | 8/2001 | Ono | 370/229 |
| 2003/0118208 A1* | 6/2003 | Epstein | 382/100 |
| 2003/0121046 A1* | 6/2003 | Roy et al. | 725/90 |
| 2005/0232588 A1 | 10/2005 | Hosoda et al. | |
| 2005/0273415 A1* | 12/2005 | Mathews et al. | 705/36 |
| 2007/0039018 A1* | 2/2007 | Saslow et al. | 725/22 |
| 2007/0124752 A1* | 5/2007 | Sakai | 725/8 |
| 2008/0066104 A1 | 3/2008 | Murakoshi | |
| 2008/0152321 A1* | 6/2008 | Ando et al. | 386/124 |
| 2008/0270344 A1* | 10/2008 | Yurick et al. | 707/2 |
| 2008/0316370 A1 | 12/2008 | Tanigawa et al. | |
| 2009/0094631 A1* | 4/2009 | Whymark et al. | 725/22 |
| 2010/0186040 A1* | 7/2010 | Ito et al. | 725/44 |
| 2010/0205633 A1* | 8/2010 | Kataoka et al. | 725/39 |
| 2010/0254604 A1* | 10/2010 | Prabhakara et al. | 382/173 |
| 2010/0319030 A1* | 12/2010 | Sakurai et al. | 725/45 |
| 2011/0153319 A1* | 6/2011 | Hejna, Jr. | 704/211 |
| 2011/0208722 A1* | 8/2011 | Hannuksela | 707/723 |
| 2011/0271001 A1* | 11/2011 | Brelay et al. | 709/231 |
| 2012/0011109 A1* | 1/2012 | Ambwani et al. | 707/722 |
| 2012/0057458 A1* | 3/2012 | Motwani | 370/235 |
| 2012/0128325 A1* | 5/2012 | Hayase | 386/241 |
| 2013/0080203 A1* | 3/2013 | Coley | 705/7.18 |
| 2013/0191415 A1* | 7/2013 | Ambwani et al. | 707/770 |
| 2013/0246508 A1* | 9/2013 | McCanne et al. | 709/203 |
| 2013/0247110 A1* | 9/2013 | Sakurai et al. | 725/54 |
| 2014/0003787 A1* | 1/2014 | Hejna, Jr. | 386/224 |

FOREIGN PATENT DOCUMENTS

| | | |
|---|---|---|
| JP | 2005-277531 A | 10/2005 |
| JP | 2008-047004 A | 2/2008 |
| JP | 2008-185626 A | 8/2008 |
| JP | 2009-027260 A | 2/2009 |
| JP | 2009-225207 A | 10/2009 |

OTHER PUBLICATIONS

Kyoko Ariyasu, "Inference of user's preferences by using live-chat data," FIT2007 Dai 6 Kai Forum on Information Technology Ippan Koen Ronbunshu, separate vol. 2, Database Shizen Gengo•Onsei•Ingaku Jinko Chino•Game Seitai Joho Kagaku, Aug. 22, 2007, pp. 317 to 318.

Kyoko Ariyasu, "An Intelligence Circulation System Based on Analyses of Viewer's Comments," IEICE Technical Report, vol. 108, No. 378, Jan. 8, 2009, pp. 5 to 9.

Extended European Search Report issued in European Patent Application No. 11843632.8 dated Apr. 28, 2015.

* cited by examiner

| BROADCAST STATION | BROADCAST STATION NAME | BROADCAST STATION SHORT NAME | BROADCAST STATION TAG |
|---|---|---|---|
| BROADCAST STATION 1 | Zyx Television | ZyxTV | zyx, ztv |
| BROADCAST STATION 2 | Alps Television | AlpTV | alp |
| BROADCAST STATION 3 | Super Radio | SPRadio | spr |
| ⋮ | ⋮ | ⋮ | ⋮ |

FIG.6

| CONTENT ID | BROADCAST STARTING TIME | BROADCAST ENDING TIME | BROADCAST STATION ID |
|---|---|---|---|
| CONTENT ID1 | 15:00:00, NOVEMBER 11, 2010 | 16:00, NOVEMBER 11, 2010 | BROADCAST STATION 1 |
| CONTENT ID2 | 18:00:00, NOVEMBER 11, 2010 | 19:30, NOVEMBER 11, 2010 | BROADCAST STATION 2 |
| ... | ... | ... | ... |

FIG.7

| TOPIC SEGMENT ID | BROADCAST STATION ID | TOPIC SEGMENT KEYWORD | STARTING TIME | ENDING TIME |
|---|---|---|---|---|
| TOPIC SEGMENT 1 | BROADCAST STATION 1 | STRONG YEN | 15:10, NOVEMBER 11, 2010 | 15:20, NOVEMBER 11, 2010 |
| TOPIC SEGMENT 2 | BROADCAST STATION 2 | BARGAIN | 18:30, NOVEMBER 11, 2010 | 19:00, NOVEMBER 11, 2010 |
| TOPIC SEGMENT 3 | BROADCAST STATION 2 | DIET PRODUCT | 18:45, NOVEMBER 11, 2010 | 19:10, NOVEMBER 11, 2010 |
| ... | ... | ... | ... | ... |

FIG.9

| BROADCAST STATION ID \ LIVE DIVISIONAL SEGMENT | 15:00 TO 15:05, NOVEMBER 11, 2010 | 15:05 TO 15:10, NOVEMBER 11, 2010 |
|---|---|---|
| BROADCAST STATION 1 | 4 | 8 |
| BROADCAST STATION 2 | 1 | 2 |

FIG.15

| CONTENT ID | TITLE | PERFORMER |
|---|---|---|
| CONTENT ID1 | ハイパーニュース<br>(Hyper News) | 日本太郎<br>(Nippon Taro) |
| CONTENT ID2 | ショッピング情報<br>(Shopping Information) | 東京花子<br>(Tokyo Hanako) |
| ⋮ | ⋮ | ⋮ |

SEGMENT CREATION DEVICE, SEGMENT CREATION METHOD, AND SEGMENT CREATION PROGRAM

CROSS-REFERENCE TO RELATED APPLICATION(S)

This application is a continuation of International Application No. PCT/JP2011/005664, filed on Oct. 7, 2011 which claims the benefit of priority of the prior Japanese Patent Application No. 2010-261779, filed on Nov. 24, 2010 and Japanese Patent Application No. 2011-213372, filed on Sep. 28, 2011, the entire contents of which are incorporated herein by reference.

BACKGROUND OF THE INVENTION

1. Field of the Invention

The present invention relates to a segment creation device, a segment creation method, and a segment creation program, which create a segment used to reproduce or edit a range matching a designated search condition in digital content such as video and audio data.

2. Description of the Related Art

At the time of viewing of broadcast content, even in the same broadcast content, a topic is not constant but changes with time, and so the demands to view only scenes related to a specific topic exist. For example, even in the same news program, news related to politics, news related to economics, news related to sports, weather/traffic information, and the like are broadcasted. All viewers do not necessarily desire to view all news, and news desired to view differs depending on a viewer.

Japanese Patent Application Laid-open No. 2009-027260 discloses a technique of deciding a starting position of an attention part using subtitle information attached to digital content.

Further, Japanese Patent Application Laid-open No. 2008-047004 discloses a technique of analyzing video to detect a digest segment representing content of a program, and setting a subtitle part of a digest segment including many keywords with a high appearance frequency detected in the entire subtitle to a headline.

However, in both of Patent Literatures No. 2009-027260 and 2008-047004, the starting position of the attention part is decided based on the subtitle information, and thus there was a problem in that it is difficult to use the techniques for content having no subtitle information. Further, there was a problem in that it is difficult to perform a search using a keyword that is not present in the subtitle information in spite of content having subtitle information.

No invention capable of deciding a viewing segment of digital content associated with a keyword based on a certain keyword without using subtitle information has been disclosed so far.

The present invention is made in light of the foregoing, and provides a technique of deciding a viewing segment of digital content associated with a keyword based on a certain keyword.

SUMMARY OF THE INVENTION

It is an object of the present invention to at least partially solve the problems in the conventional technology.

According to an aspect of the present invention a segment creation device, includes: a live data acquiring unit that acquires character string data transmitted from a plurality of terminals, and acquires live data that includes the character string data and a data registration date and time which is a date and time at which the character string data is acquired; a condition input unit that causes a user to input a search condition including time zone information representing a predetermined time zone and character string information; a live data number counting unit that counts the number of pieces of live data having character string data which is included in the predetermined time zone and matches with the character string information at intervals of a predetermined unit time; and a segment creating unit that creates segment data which is specified based on a starting time of a time period and one of an ending time of the time period or a length of the time period, the time period being a period in which the unit times in each of which the number of pieces of live data counted by the live data number counting unit is a predetermined threshold value or more are consecutive.

According to another aspect of the present invention, a segment creation device includes: a live data acquiring unit that acquires character string data transmitted from a plurality of terminals, and acquires live data that includes the character string data and a data registration date and time which is a date and time at which the character string data is acquired; a condition input unit that causes a user to input a search condition including time zone information representing a predetermined time zone and character string information; a live data number counting unit that counts the number of pieces of live data having character string data which is included in the predetermined time zone and matches with the character string information at intervals of a predetermined unit time; and a segment creating unit that creates segment data by adding a predetermined time period to before and after a unit time which is largest in the number of pieces of live data counted by the live data number counting unit.

According to still another aspect of the present invention, a segment creation method includes: acquiring character string data transmitted from a plurality of terminals, and acquiring live data that includes the character string data and a data registration date and time which is a date and time at which the character string data is acquired; causing a user to input a search condition including time zone information representing a predetermined time zone and character string information; counting the number of pieces of live data having character string data which is included in the predetermined time zone and matches with the character string information at intervals of a predetermined unit time; and creating segment data which is specified based on a starting time of a time period and one of an ending time of the time period or a length of the time period, the time period being a period in which the unit times in each of which the number of pieces of live data is a predetermined threshold value or more are consecutive.

According to still another aspect of the present invention, a segment creation method includes: acquiring character string data transmitted from a plurality of terminals, and acquiring live data that includes the character string data and a data registration date and time which is a date and time at which the character string data is acquired; causing a user to input a search condition including time zone information representing a predetermined time zone and character string information; counting the number of pieces of live data having character string data which is included in the predetermined time zone and matches with the character string information at intervals of a predetermined unit time; and creating segment data by adding a predetermined time period to before and after a unit time which is largest in the number of pieces of live data.

According to still another aspect of the present invention, a computer program product includes a non-transitory computer usable medium having computer readable program codes embodied in the medium causing a computer to execute: acquiring character string data transmitted from a plurality of terminals, and acquiring live data that includes the character string data and a data registration date and time which is a date and time at which the character string data is acquired; causing a user to input a search condition including time zone information representing a predetermined time zone and character string information; counting the number of pieces of live data having character string data which is included in the predetermined time zone and matches with the character string information at intervals of a predetermined unit time; and creating segment data which is specified based on a starting time of a time period and one of an ending time of the time period or a length of the time period, the time period being a period in which the unit times in each of which the number of pieces of live data is a predetermined threshold value or more are consecutive.

According to still another aspect of the present invention, a computer program product includes a non-transitory computer usable medium having computer readable program codes embodied in the medium causing a computer to execute: acquiring character string data transmitted from a plurality of terminals, and acquiring live data that includes the character string data and a data registration date and time which is a date and time at which the character string data is acquired; causing a user to input a search condition including time zone information representing a predetermined time zone and character string information; counting the number of pieces of live data having character string data which is included in the predetermined time zone and matches with the character string information at intervals of a predetermined unit time; and creating segment data by adding a predetermined time period to before and after a unit time which is largest in the number of pieces of live data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of a format of a broadcast content storing unit;

FIG. 7 is a diagram illustrating an example of a format of a topic segment storing unit;

FIG. 9 is a diagram illustrating an example of a table of counting the number of pieces of live data;

FIG. 15 is a diagram illustrating an example of a format of a content information storing unit;

DETAILED DESCRIPTION OF THE PREFERRED EMBODIMENTS

Hereinafter, several embodiments of embodying the present invention will be described below.

First Embodiment

Figure 1:
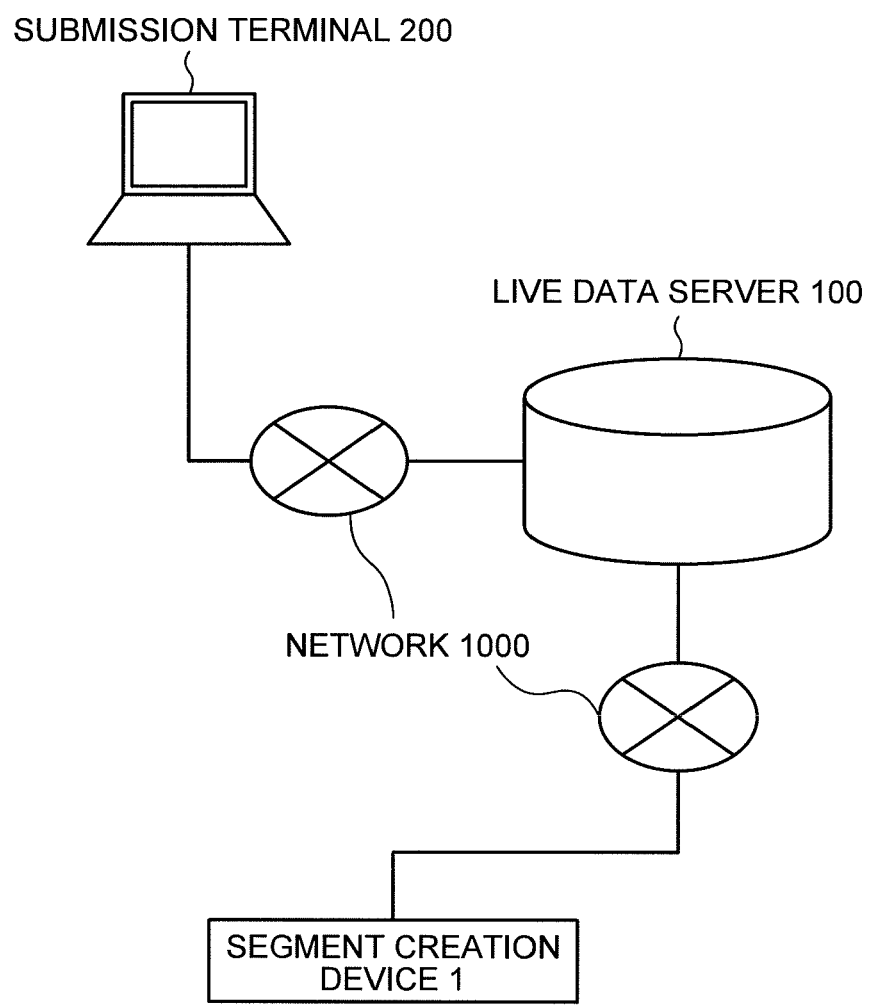
FIG. 1 is a diagram illustrating a system configuration according to an embodiment of the present invention.

FIG. 1 is a diagram illustrating an overall system according to a first embodiment of the present invention, and illustrates that a segment creation device 1 is connected with a live data server 100 via a network 1000, and the live data server 100 is connected with a posting terminal 200 via the network 1000.

The live data server 100 is a server that accumulates data transmitted from a user who uses a service represented by a so-called SNS (Social Networking Service), a BBS (Bulletin Board System), a blog (including a mini blog), and the like, and is a server for opening to other users. The data accumulated in the live data server is data including character information representing the user's feeling when the data is created. The live data server 100 according to the first embodiment stores character information transmitted by the posting terminal 200 in combination with a date and a time at which the character information is received. Further, a plurality of live data servers 100 may be provided.

Figure 2:
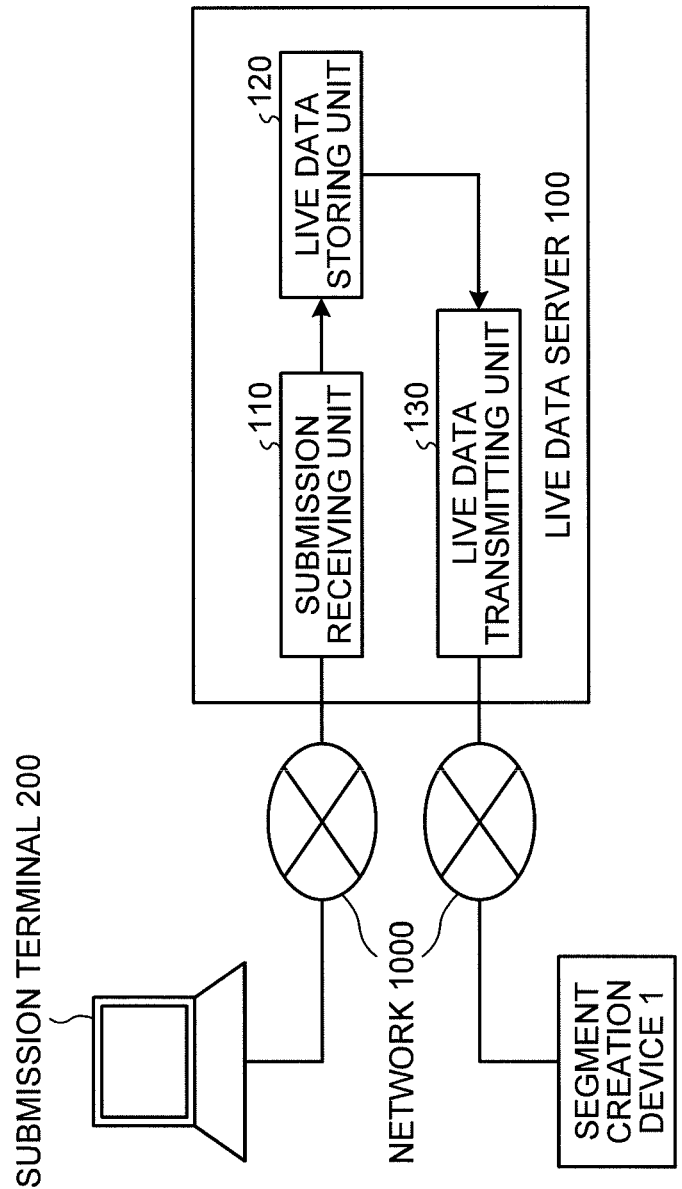
FIG. 2 is a block diagram illustrating a configuration of a live data server according to an embodiment of the present invention.

FIG. 2 is a block diagram illustrating a configuration of the live data server 100. The live data server 100 includes a posting receiving unit 110, a live data storing unit 120, and a live data transmitting unit 130.

The posting receiving unit 110 receives character information transmitted from the external posting terminal 200 via the network 1000, and stores the character information in the live data storing unit 120 together with a posting date and time which is a reception date and time. Here, data in which character information is combined with a posting date and time of the character information is hereinafter referred to as "live data."

The live data storing unit 120 is a database that stores live data.

The live data transmitting unit 130 transmits the live data stored in the live data storing unit 120 via the network 1000. Further, when a search condition of live data such as a range of a posting date and time or a character string included in character information is designated by the segment creation device 1, the live data transmitting unit 130 transmits exclusively live data matching the search condition to the segment creation device 1.

The live data server 100 has been described so far. Further, a plurality of live data servers 100 may be provided, instead of only one.

The posting terminal 200 is a terminal that includes an input interface and a display unit such as a general PC (personal computer) or a portable information terminal which are used to edit character information, and further includes a communication unit that transmits the character information to the live data server 100. A plurality of posting terminals 200 may be provided. The posting terminal 200 may be used by one or more users. Further, the user of the posting terminal 200 may not necessarily be the user of the segment creation device 1.

Next, the segment creation device 1 will be described. The segment creation device 1 detects a segment, which has been broadcasted in connection with a designated keyword, from live data for each broadcast station. For example, when a keyword a "strong yen" is designated, a process of detecting a segment which has been broadcasted in connection with a "strong yen" for each the broadcast station ID is performed based on the live data. As described above, a time interval detected based on a designated keyword is referred to as a "topic segment." Further, a keyword used to detect a topic segment is referred to as a "topic segment keyword." Further, data in which a starting time of a topic segment, an ending time of a topic segment, a topic segment keyword, an identifier identifying a broadcast station are combined with one another is referred to as "topic segment data."

Figure 3:
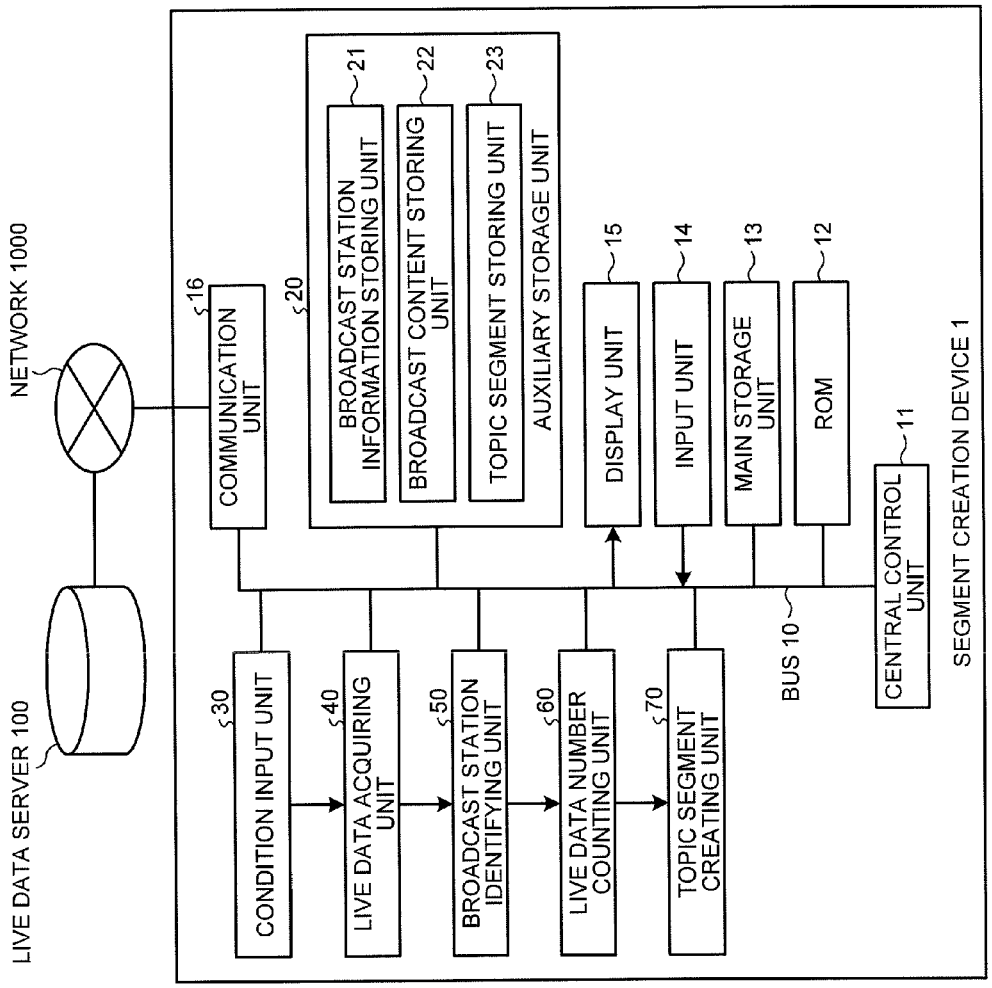
FIG. 3 is a block diagram illustrating a configuration of a segment creation device according to a first embodiment.

FIG. 3 is a block diagram illustrating a preferred configuration of the segment creation device 1 according to the first embodiment. The segment creation device 1 includes a central control unit 11, a ROM (read only memory) 12, a main storage unit 13, an input unit 14, a display unit 15, a communication unit 16, an auxiliary storage unit 20, a condition input unit 30, a live data acquiring unit 40, a broadcast station identifying unit 50, a live data number counting unit 60, and a topic segment creating unit 70, which are connected with one another via a bus 10. Further, the communication unit 16 is connected to the live data server 100 which is an external device via the network 1000.

In FIG. 3, a hardware configuration of the segment creation device 1 is illustrated by a functional block diagram, and the entire segment creation device 1 may be executed on a PC including a memory or a CPU (central processing unit) in a software manner as a software program.

Figures 4, 5:
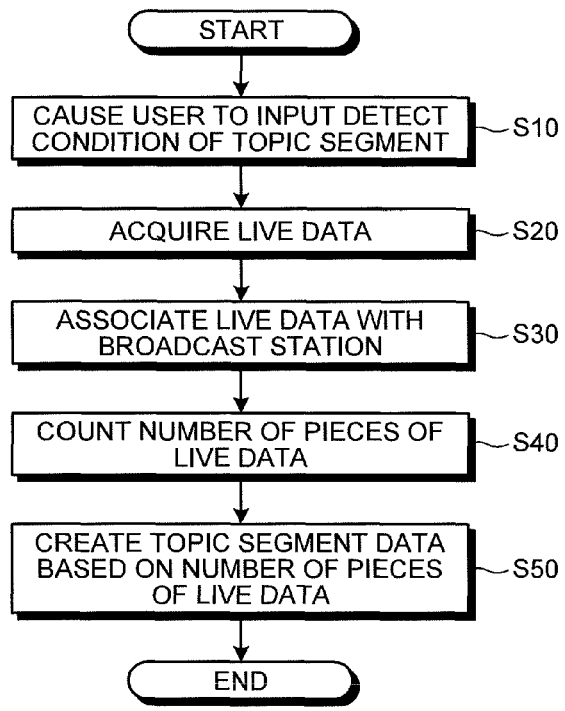
FIG. 4 is a flowchart illustrating the flow of a process in a segment creation device.
FIG. 5 is a diagram illustrating an example of a format of a broadcast station information storing unit.

Next, a process flow of creating topic segment data from live data by the segment creation device 1 will be described with reference to a flowchart of FIG. 4.

First, the condition input unit 30 of the segment creation device 1 causes the user to input a condition for detecting a topic segment (step S10).

Next, the live data acquiring unit 40 of the segment creation device 1 acquires live data from the live data server 100 (step S20).

Next, the broadcast station identifying unit 50 of the segment creation device 1 associates the live data acquired in step S20 with a broadcast station (step S30).

Next, the live data number counting unit 60 of the segment creation device 1 counts the number of pieces of live data by dividing the segment for each broadcast station (step S40).

Next, the topic segment creating unit 70 of the segment creation device 1 detects a topic segment and creates topic segment data based on the number of pieces of live data counted in step S40 (step S50).

The process flow of creating the topic segment data by the segment creation device 1 has been described so far.

Next, the respective components of the segment creation device 1 will be described in detail. The central control unit 11 is a unit that controls an overall operation of the segment creation device 1 and is configured with a CPU (Central Processing Unit), a PLD (Programmable Logic Device), or the like. The ROM 12 is a read only storage medium, and stores a basic control program for controlling the overall segment creation device 1. The main storage unit 13 is a work area in which the central control unit 11 executes a program, and is configured with a RAM (random access memory) or the like. The input unit 14 is a unit that includes a keyboard, a mouse, a touch panel, and the like and receives the user's input. The display unit 15 is a unit that includes a CRT (cathode ray tube) or an LCD (liquid crystal display) and displays information to the user. The communication unit 16 is a unit that includes a network card and the like, and performs communication with an external network.

The auxiliary storage unit 20 is a mass storage medium such as a HDD (Hard Disk Drive) or a SSD (Solid State Drive), and includes a broadcast station information storing unit 21, a broadcast content storing unit 22, and a topic segment storing unit 23 thereinside.

The broadcast station information storing unit 21 stores a broadcast station ID which is an identifier uniquely identifying a broadcast station, a broadcast station name, a broadcast station short name, and a broadcast station tag in combination with one another. The broadcast station short name is an abbreviation of the broadcast station name. The broadcast station tag is a unique name tag representing a broadcast station, and a plurality of tags may be stored. FIG. 5 is a diagram illustrating an example of a format of the broadcast station information storing unit 21, and the broadcast station information storing unit 21 stores the broadcast station ID and the broadcast station name in combination with each other. For example, when the broadcast station ID is "broadcast station 1," the broadcast station name is "Zyx Television," the broadcast station short name is "ZyxTV," and two broadcast station tags of "zyx" and "ztv" are set. Further, when the broadcast station ID is "broadcast station 2," the broadcast station name is "Alps Television," the broadcast station short name is "AlpTV," and the broadcast station tag is "alp."

The broadcast content storing unit 22 stores a content ID which is an identifier uniquely identifying broadcast content broadcasted by a broadcast station, a broadcast station ID representing the broadcast station that has broadcasted the broadcast content, a broadcast starting time which is a time at which broadcasting has started, and a broadcast ending time at which broadcasting has ended in combination with one another. FIG. 6 is a diagram illustrating an example of a format of the broadcast content storing unit 22. Referring to FIG. 6, "15:00, Nov. 11, 2010," "16:00, Nov. 11, 2010," and "broadcast station 1" are stored as the broadcast starting time, as the broadcast ending time, and the broadcast station ID, respectively, with regard to broadcast content in which the content ID is "content ID1." The broadcast starting time refers to a time at which broadcasting of broadcast content has started. In other words, it indicates that the content ID1 started to be broadcasted at exact 15:00:00, Nov. 11, 2010. Further, the broadcast ending time refers to a time at which broadcasting of broadcast content has ended. In other words, it indicates that the content ID1 has been broadcasted until 16:00, Nov. 11, 2010.

Further, the length of time during which broadcast content is broadcasted may be stored instead of the broadcast ending time. Here, when "one hour" is set as the length of broadcast time, in the example of FIG. 6, since the broadcast starting time is "15:00, Nov. 11, 2010," "16:00, Nov. 11, 2010" can be calculated based on the broadcast starting time and the length of broadcast time as the broadcast ending time.

Further, the broadcast starting time and the broadcast ending time are basically stored using date and time data of the UTC (Universal Time, Coordinated), however it may not necessarily be date and time data as far as it can be converted into the UTC. For example, data representing the JST (Japan Standard Time) may be used, and numerical data representing the Unix (a registered trademark) time which is a relative time starting at 00:00:00, Jan. 1, 1970 in the UTC may be used.

The broadcast station ID and the content ID are convertible into each other based on the time information.

The topic segment storing unit 23 stores topic segment data. The topic segment data includes a broadcast station ID identifying a broadcast station, a topic segment keyword, a starting time of a topic segment, and an ending time of a topic segment as described above. FIG. 7 is a diagram illustrating an example of a format of the topic segment storing unit 23, and the topic segment storing unit 23 stores a topic segment ID which is an identifier identifying topic segment data in addition to the broadcast station ID, the topic segment keyword, the starting time, and the ending time. For example, when the topic segment ID is "topic segment 1," the broadcast station ID is "broadcast station 1," the topic segment keyword is "strong yen," the starting time is "15:10, Nov. 11, 2010," and the ending time is "15:20, Nov. 11, 2010." The topic segment data of the "topic segment 1" represents that broadcast content which the broadcast station 1 has broadcasted between 15:10 and 15:20, Nov. 11, 2010 is a segment broadcast in connection with "strong yen."

Further, the length of time of the topic segment may be stored instead of the ending time of the topic segment. Here, when "ten hours" is set as the length of the topic segment, in the example of FIG. 7, since the starting time of the topic segment is "15:00, Nov. 11, 2010," "1:00, Nov. 12, 2010" can be calculated as the ending time of the topic segment based on the starting time of the topic segment and the length of time of the topic segment.

Further, the starting time of the topic segment, and the ending time of the topic segment are basically stored using date and time data of the UTC (Universal Time, Coordinated), however it may not necessarily be date and time data as far as it can be converted into the UTC. For example, data representing the JST (Japan Standard Time) may be used, and numerical data representing the Unix (a registered trademark) time which is a relative time starting at 00:00:00, Jan. 1, 1970 in the UTC may be used.

The condition input unit 30 causes the user to set a topic segment keyword and a live period in order to create topic segment data. The live period refers to a time interval between the starting time and the ending time, and the topic segment is detected based on a time included in this live period. In other words, the live period the topic segment. In order to cause the user to input the topic segment keyword and the live period, a user interface for assisting an input is displayed on the display unit 15. The user inputs a condition by means of the input unit 14 with reference to a user interface screen.

Figure 8:
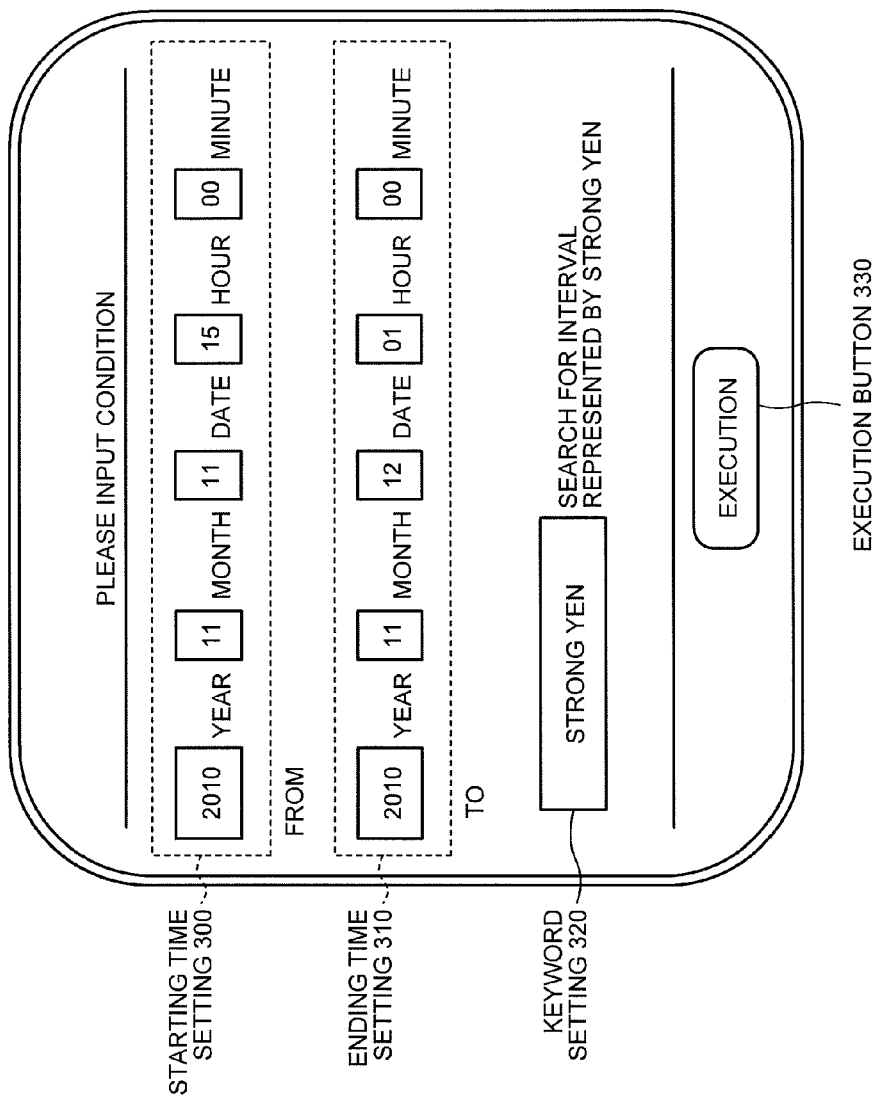
FIG. 8 is a diagram illustrating an example of a user interface provided by a condition input unit.

FIG. 8 is an example of the user interface provided by the condition input unit 30. A starting time setting 300 of FIG. 8 is a user interface component used to designate a starting time of the live period. An ending time setting 310 is a user interface component used to designate an ending time of the live period. A keyword setting 320 is a user interface component used to input a topic segment keyword. Here, when an execution button 330 is pushed down, a topic segment creation condition is created based on the starting time setting 300, the ending time setting 310, and the keyword setting 320. In the state illustrated in FIG. 8, when the execution button 330 is pushed down, the starting time of the live period is set "15:00, Nov. 11, 2010" by the starting time setting 300, the ending time of the live period is set to "1:00, Nov. 12, 2010" by the ending time setting 310. Further, topic segment keyword is set to "strong yen."

The live data acquiring unit 40 acquires live data which has a posting time within the live period and includes a topic segment keyword as the character information from the live data server 100 via the communication unit 16. For example, when the starting time of the live period is set to "15:00, Nov. 11, 2011," the ending time of the live period is set to "1:00, Nov. 12, 2011," and the topic segment keyword is set to "strong yen" by the condition input unit 30, live data that has a posting date and time in this period and includes "strong yen" in the character information is acquired from the live data server 100.

The broadcast station identifying unit 50 discerns to which broadcast content of the broadcast station the live data refers based on the character information of the live data received by the live data acquiring unit 40, and associates the live data with the broadcast station ID. Specifically, the broadcast station identifying unit 50 discerns whether or not the broadcast station name, the broadcast station short name, or the broadcast station tag, which is stored in the broadcast station information storing unit 21 is included in the character information of the live data, and performs an associating operation.

Here, three concrete examples of associating live data with a broadcast station using the example of FIG. 5 as the broadcast station information storing unit 21 will be described.

(1) When the character information of the live data represents "Alps Television is currently being viewed," since the broadcast station name "Alps Television" whose broadcast station ID is "broadcast station 2" is included in the character information of the live data, the live data is associated with the broadcast station 2.

(2) When the character information of the live data representing "ZyxTV is being viewed," since the broadcast station short name "ZyxTV" whose broadcast station ID is "broadcast station 1" is included in the character information of the live data, the live data is associated with the broadcast station 1.

(3) When the character information of the live data represents "HyperNews is being viewed. #ztv," since the broadcast station tag "ztv" whose broadcast station ID is "broadcast station 1" is included in the character information of the live data, the live data is associated with the broadcast station 1.

As described above, the live data is associated with the broadcast station ID based on the broadcast station name, the broadcast station short name, and the broadcast station tag. When the character information of the live data matches with a plurality of broadcast station IDs, the live data is associated with the broadcast station ID for all of the matched broadcast stations.

The live data number counting unit 60 counts the number of pieces of live data which is the number of pieces of live data matching with a keyword designated by the condition input unit 30 for each the broadcast station ID. Further, when the number of pieces of live data is counted, the live data number counting unit 60 creates live divisional segments by dividing the live period set by the condition input unit 30 at predetermined time intervals, and counts the number of pieces of live data for each of the live divisional segments.

FIG. 9 is a diagram illustrating a result of creating two live divisional segments of "15:00 to 15:05, Nov. 11, 2010" and, "15:05 to 15:10, Nov. 11, 2010" by dividing a live segment of "15:00 to 15:10, Nov. 11, 2010" at five intervals and then counting the number of pieces of live data which corresponds to each of the live divisional segments and each of the two broadcast station IDs "broadcast station 1" and "broadcast station 2." According to FIG. 9, in the broadcast station 1, the number of pieces of live data of live divisional segment 15:00 to 15:05 is 4, and the number of pieces of live data of the live divisional segment 15:05 to 15:10 is 8. In the broadcast station 2, the number of pieces of live data of live divisional segment 15:00 to 15:05 is 1, and the number of pieces of live data of the live divisional segment 15:05 to 15:10 is 2. As described above, the live data number counting unit 60 creates a live data number table in which the live divisional segment is associated with the broadcast station ID.

Figure 10:
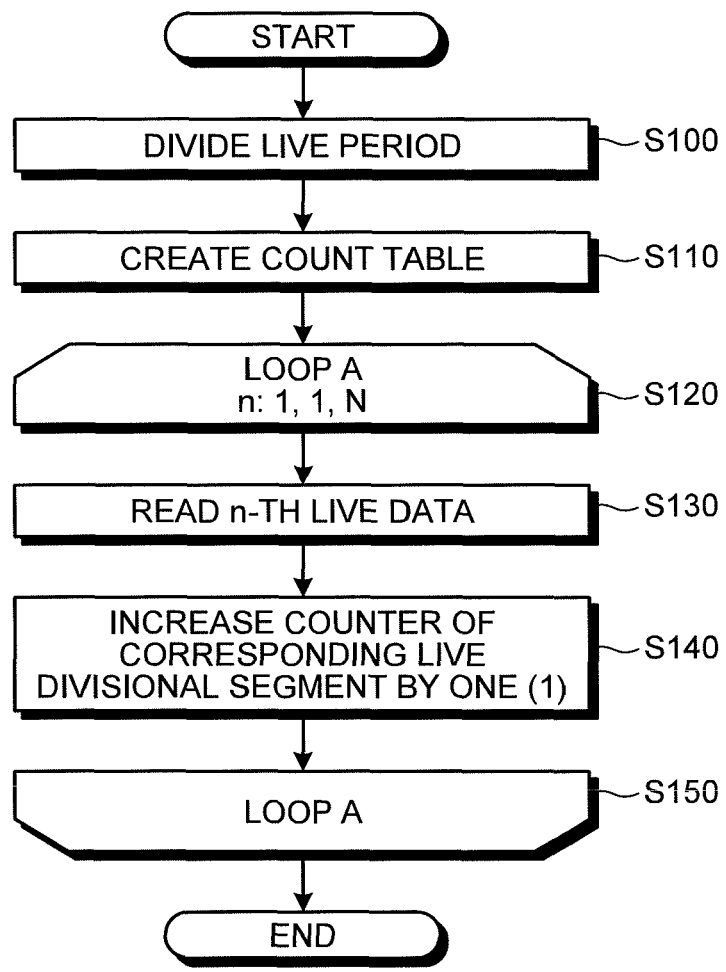
FIG. 10 is a flowchart illustrating the flow of a process in a live data number counting unit.

Next, the process flow in the live data number counting unit 60 will be described with reference to a flowchart of FIG. 10. First, the live data number counting unit 60 divides the live period set by the condition input unit 30 at predetermined intervals, and creates live divisional segments (step S100). Here, let us assume that the live period is divided at five-minute intervals. When the starting time is "15:00, Nov. 11, 2011," a first segment is 15:00 to 15:05 of Nov. 11, 2011, a second segment is 15:05 to 15:10 of the same day, and a third segment is 15:10 to 15:15 of the same day. The division is performed until the ending time of the live period.

Next, the live data number counting unit 60 creates a count table which is a table for counting the number of pieces of live data (step S110). This table is a table in which the position of the number of pieces of live data to be stored is decided based on a correspondence between a corresponding broadcast station ID and a live divisional segment as illustrated in FIG. 9. The broadcast station ID stored in the broadcast station information storing unit 21 is used as the broadcast station ID, and the live divisional segment created in step S100 is used as the live divisional segment.

Next, the live data number counting unit 60 starts a loop (step S120). A symbol illustrated in step S120 represents a loop start, and a loop identifier "loop A" represents that a loop operation is performed until a loop counter n in which a starting value is 1 and an increment is 1 reaches an ending value N. The ending value N is a total of the number of pieces of live data acquired by the live data acquiring unit 40.

Next, the live data number counting unit 60 causes the live data acquiring unit 40 to read n-th live data (step S130).

Next, the live data number counting unit 60 increases a counter, which is at the position of the counter table which corresponds to a live divisional segment including a posting date and time of the n-th live data and a broadcast station ID associated with the n-th live data, by one (step S140). Here, when the n-th live data is associated with a plurality of broadcast station IDs, the above process is performed on all the associated broadcast station IDs.

Next, the live data number counting unit 60 checks a loop ending condition (step S150). A symbol illustrated in step S150 represents a termination of a loop. It is determined whether or not the loop identifier "loop A" has satisfied the ending condition, that is, whether or not the loop counter n has reached the ending value N. Here, when the ending condition has been satisfied, the live data number counting unit 60 ends the process. Otherwise, the loop counter n is increased by an increment 1, and the process returns to step S120.

The process of the live data number counting unit 60 has been described so far.

Figure 11:
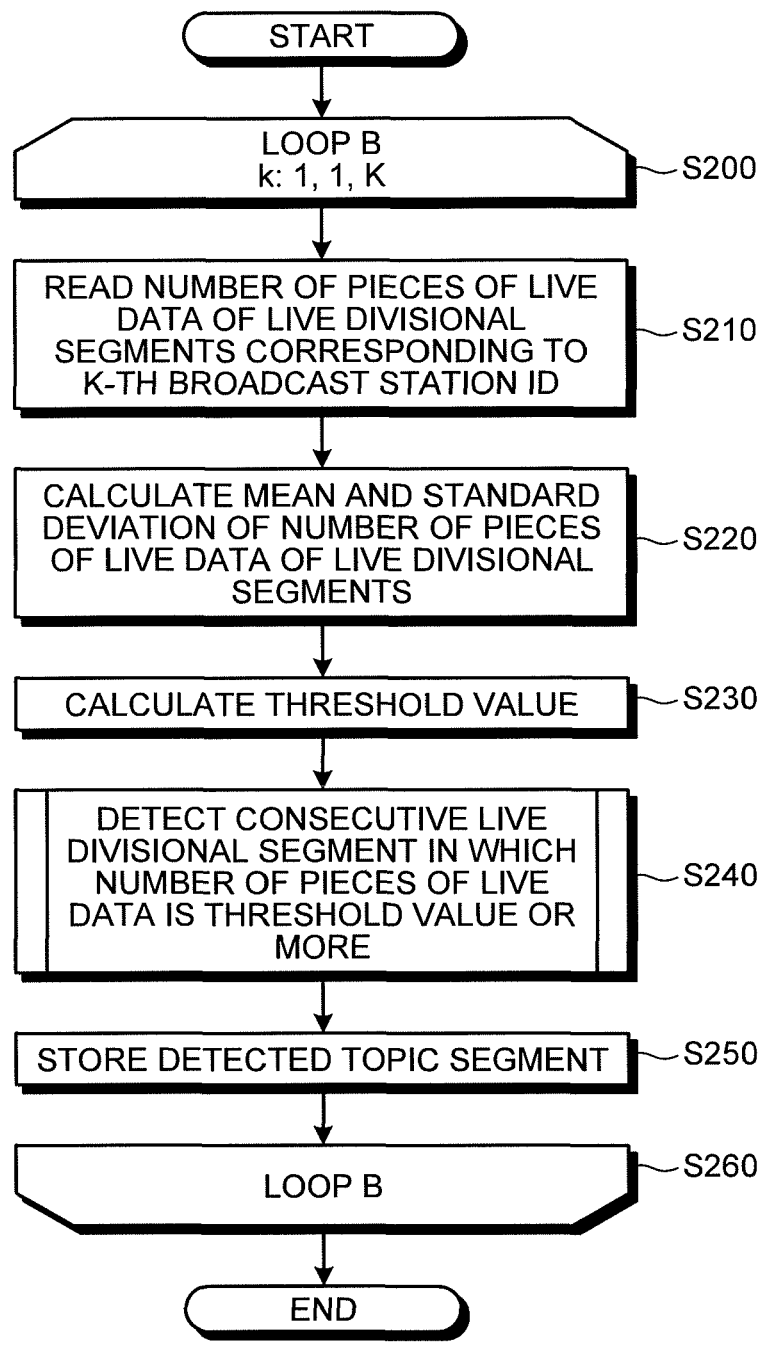
FIG. 11 is a flowchart illustrating the flow of a process in a topic segment creating unit.

Referring back to FIG. 3, the topic segment creating unit 70 detects a topic segment based on the number of pieces of live data calculated by the live data number counting unit 60 for each broadcast station ID, and stores topic segment data, in which the starting time of the detected topic segment, the ending time, the broadcast station ID, and the topic segment keyword are combined with one another, in the topic segment storing unit 23. In the first embodiment, a representative topic segment detecting method will be described with reference to a flowchart of FIG. 11.

First, the topic segment creating unit 70 sets the total number of the broadcast station IDs stored in the broadcast station information storing unit 21 to K, and starts a loop identifier "loop B" which is performed until a loop counter k in which a starting value is 1 and an increment is 1 reaches an ending value K (step S200).

Next, the topic segment creating unit 70 takes out the number of pieces of live data of the live divisional segments corresponding to a k-th broadcast station ID from the counter table created by the live data number counting unit 60 (step S210).

Next, the topic segment creating unit 70 calculates a mean M and a standard deviation S of the number of pieces of live data of the live divisional segments read in step S210 (step S220).

Next, the topic segment creating unit 70 calculates a threshold value θ by the following Formula (1) based on the adjustment parameter α and the mean M and the standard deviation S of the number of pieces of live data calculated in step S220 (step S230).

$$\theta = M - \alpha S \quad (1)$$

The adjustment parameter α is a real number of about 0.5 to 2.0 which is set by a designer in advance, and a value of about 1.0 is desirable. When the value of the adjustment parameter α is set to be a large number, the length of the detected topic segment increases, whereas when the value of the adjustment parameter α is set to be a small number, the length of the detected topic segment decreases. Further, when the threshold value θ is zero (0) or less, the threshold value θ becomes zero (0).

Figure 12:
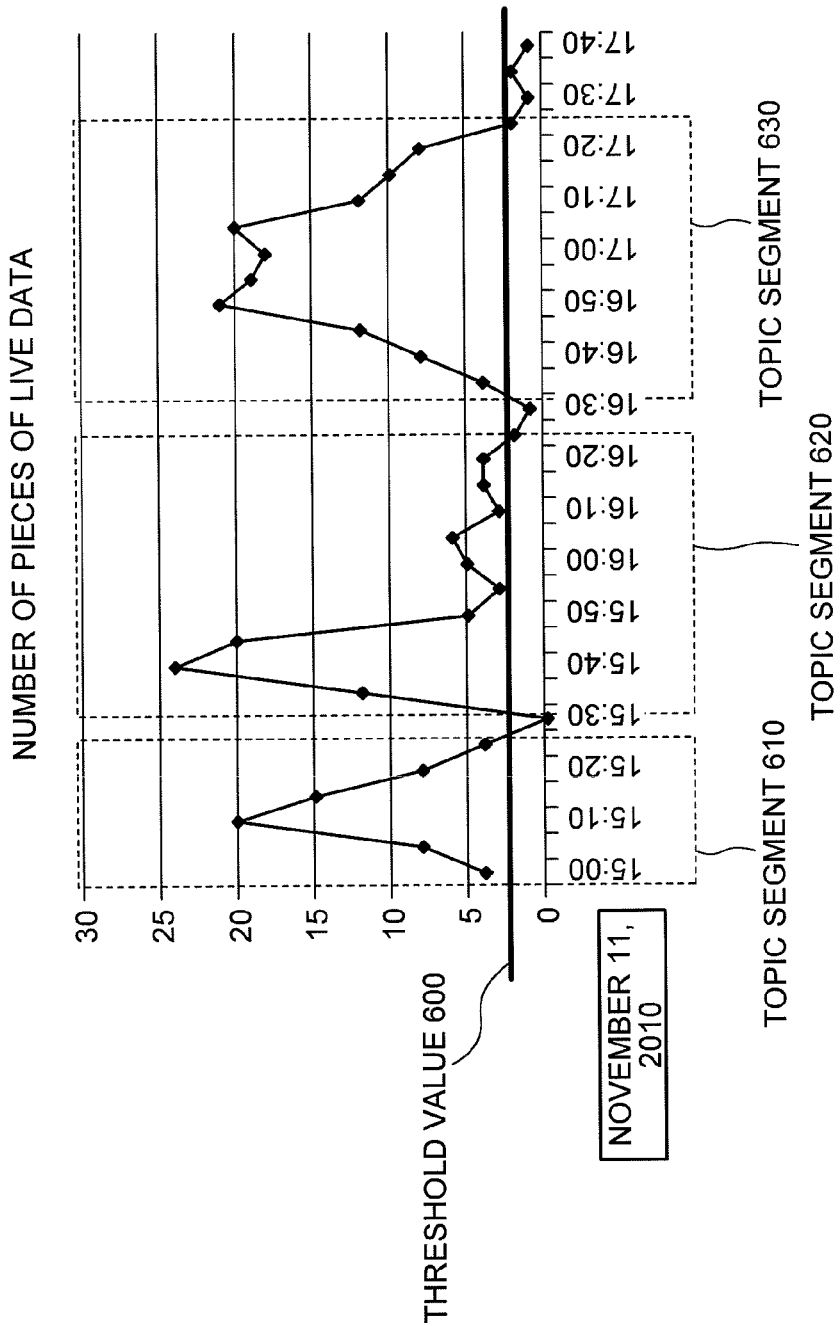
FIG. 12 is a diagram illustrating an aspect of creating a topic segment schematically from a graph example of the number of pieces of live data.

Next, the topic segment creating unit 70 detects the topic segment from the live divisional segment in which the number of pieces of live data is the threshold value θ or more (step S240). FIG. 12 is a graph illustrating the number of pieces of live data when the live period is set to 15:00 to 17:50 of Nov. 11, 2010 and divided in units of five minutes to create live divisional segments. Further, a provisional data sample may be used for the number of pieces of live data. In the topic segment detecting process of step S240 by the topic segment creating unit 70, consecutive live divisional segments in which the number of pieces of live data is a threshold value 600 or more are generated as topic segments, and as a result of the process, three topic segments, that is, a topic segment of 15:00 to 15:25 represented by a topic segment 610, a topic segment of 15:35 to 16:25 represented by a topic segment 620, and a topic segment of 16:35 to 17:25 represented by a topic segment 630 can be created.

Figure 13:
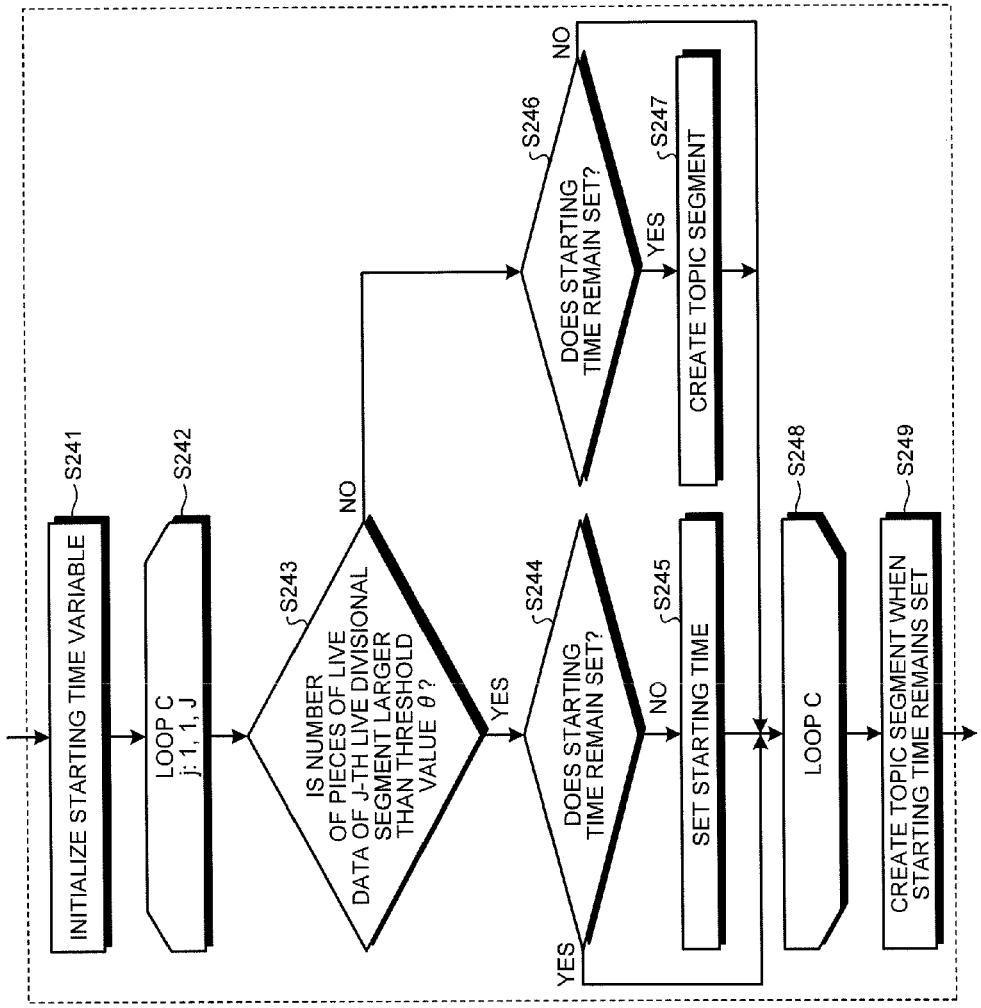
FIG. 13 is a flowchart illustrating the flow of a topic segment detecting process.

The topic segment detecting process of step S240 will be described with reference to a sub flowchart of FIG. 13.

In the topic segment detecting process, first, a starting time variable used to store the starting time of the topic segment is initialized (step S241).

Next, when the number of live divisional segment is J, the topic segment creating unit 70 starts a loop operation of a loop identifier "loop C" until a loop counter j in which an initial value is 1 and an increment is 1 reaches an ending value J (step S242).

Next, it is determined whether or not the number of pieces of live data at the table position decided based on a k-th broadcast station ID and a j-th live divisional segment is larger than the threshold value θ (step S243). Here, when the number of pieces of live data is larger than the threshold value θ, the process proceeds to step S244, and when the number of pieces of live data is not larger than the threshold value θ, the process proceeds to step S246. Here, when it is determined in step S243 that the number of pieces of live data is larger than the threshold value θ, the topic segment creating unit 70 further determines whether or not a starting time is set in the starting time variable (step S244). Here, when it is determined the starting time is set, the process proceeds to step S248 which is a loop termination, whereas when it is determined the starting time is not set, the process proceeds to step S245.

Next, when it is determined in step S244 that the starting time is not set in the starting time variable, the topic segment creating unit 70 sets the starting time of the j-th live divisional segment in the starting time variable (step S245).

Returning to the description of the determination of step S243, when it is determined that the number of pieces of live data is not larger than the threshold value θ, the topic segment creating unit 70 further determines whether or not the starting time is set in the starting time variable (step S246). Here, when it is determined the starting time is not set, the process proceeds to step S248 which is a loop termination, whereas when it is determined the starting time is set, the process proceeds to step S247.

Next, when it is determined in step S246 that the starting time is set, the topic segment creating unit 70 creates a topic segment (step S247). The starting time of the topic segment is set as the starting time stored in the starting time variable, and the ending time of the topic segment is set as the starting time of the j-th live divisional segment. Here, when the topic segment is created, the topic segment creating unit 70 initializes the starting time variable for returning to a non-set state. Next, step S248 represents a termination signal of the loop C (step S248). Here, when it is determined that the loop C satisfies the ending condition, the topic segment creating unit 70 causes the process to proceed to step S249, whereas when it is determined that the loop C does not satisfy the ending condition, the process returns to step S242 and is repeated. Next, when it is determined the starting time variable is set, the topic segment creating unit 70 sets the starting time stored in the starting time variable as the starting time of the topic segment, sets the ending time of the topic segment as the ending time of the live period, and creates the topic segment (step S249).

The topic segment detecting process of step S240 has been described so far.

Next, the topic segment creating unit 70 creates topic segment data in which the k-th broadcast station ID is combined with the topic segment keyword for each topic segment detected in step S240, and stores the created topic segment data in the topic segment storing unit 23 (step S250).

Next, the topic segment creating unit 70 determines whether or not the loop B has satisfied the ending condition (step S260). Here, when it is determined that the loop B has satisfied the ending condition, the topic segment creating unit 70 ends the process. However, when it is determined that the loop B has not satisfied the ending condition, the process returns to step S200.

The topic segment creating unit 70 has been described so far.

Further, the threshold value θ may be set to a predetermined value without using Formula (1).

The segment creation device 1 has been described so far. As described above, the segment creation device 1 can detect a starting time and an ending time of a segment represented by a specific keyword and further can associate the segment with a broadcast station. Thus, it is possible to edit recorded broadcast content by cutting out the detected segment or reproduce recorded broadcast content only in the detected segment.

Further, a plurality of topic segment keywords may be designated, and live segment data matching with both topic segment keywords may be acquired from the live data server 100. For example, when a search condition in which topic segment keywords are connected by a "+" symbol such as "strong yen+weak dollar" is designated, the live data server 100 returns live data including both a keyword of "strong yen" and a keyword of "weak dollar."

Further, a topic segment keyword including no specific keyword may be set. For example, when a search condition in which "NOT" is attached to the head of a topic segment keyword such as "NOT weak dollar" is designated, the live data server 100 returns live data including no keyword subsequent thereto, that is, "weak dollar" in this case.

Further, when live data is received from a specific live data server, the live data may be associated with a predetermined broadcast station. For example, when there is a live data server that receives posting related to broadcast content whose broadcast station ID is "broadcast station 1," all live data acquired from the live data server may be associated with the broadcast station ID "broadcast station 1."

Further, in the first embodiment, the topic segment is created for each broadcast station ID. However, since the same effect is obtained even when the topic segment is created for each content ID, the topic segment may be created for each of the content ID. For conversion from the broadcast station ID to the content ID, it is possible to specify the content ID based on the topic segment and the broadcast station ID with reference to the broadcast content storing unit 22.

Second Embodiment

A system configuration according to a second embodiment is the same as the system configuration according to the first embodiment illustrated in FIG. 1 but differs in a configuration of the segment creation device 1. In the second embodiment, the description will proceed as a segment creation device 2.

In the broadcast station identifying unit 50 of the segment creation device 1 according to the first embodiment, a broadcast station is identified depending on whether or not a character string specifying a broadcast station is included in character information of live data. On the other hand, the segment creation device 2 according to the second embodiment estimates a broadcast station based on character information of live data and information of broadcast content which has been broadcast at a time corresponding to a posting date and time of live data.

Figure 14:
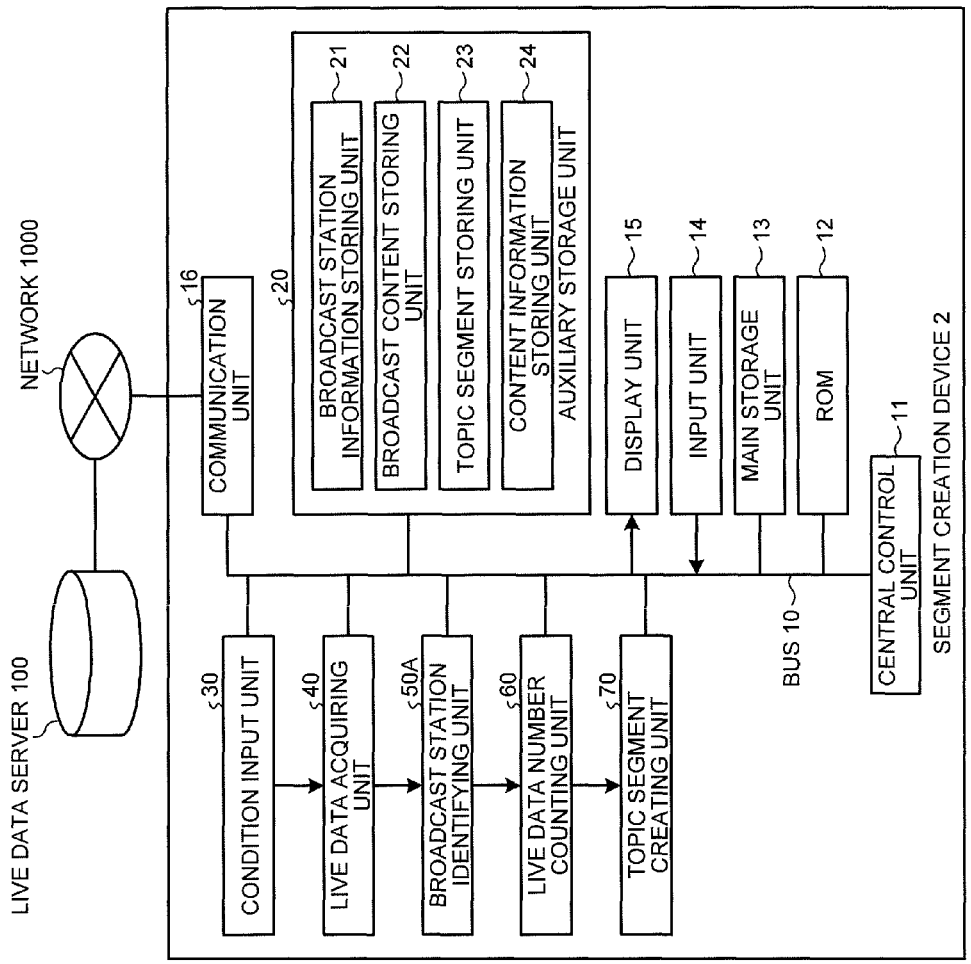
FIG. 14 is a block diagram illustrating a configuration of a segment creation device according to a second embodiment.

FIG. 14 is a block diagram illustrating a configuration of the segment creation device 2. The segment creation device 2 is different from the segment creation device 1 according to the first embodiment in that a content information storing unit 24 is added to the inside of the auxiliary storage unit 20, and an operation of the broadcast station identifying unit 50 is different. Thus, in the second embodiment, the broadcast station identifying unit 50 having a different operation is referred to as a broadcast station identifying unit 50A, and the description will be made in connection with the content information storing unit 24 and the broadcast station identifying unit 50A. The remaining components are the same as those in the segment creation device 1, and thus the description thereof will be omitted. A process of creating topic segment data by the segment creation device 2 is the same as the process by the segment creation device 1 illustrated in FIG. 4.

The content information storing unit 24 stores a content ID in combination with content information which is supplementary data of the content ID. The content information refers to a title or a performer of broadcast content, a subtitle, a genre, a brief description of broadcast content, or the like. FIG. 15 is a diagram illustrating an example of a format of the content information storing unit 24, and a title and performer are stored as the content information. Referring to FIG. 15, a title of a content ID1 is "ハイパーニュース (HyperNews)," and the performer is "日本太郎 (Nippon Taro)."

Figure 16:
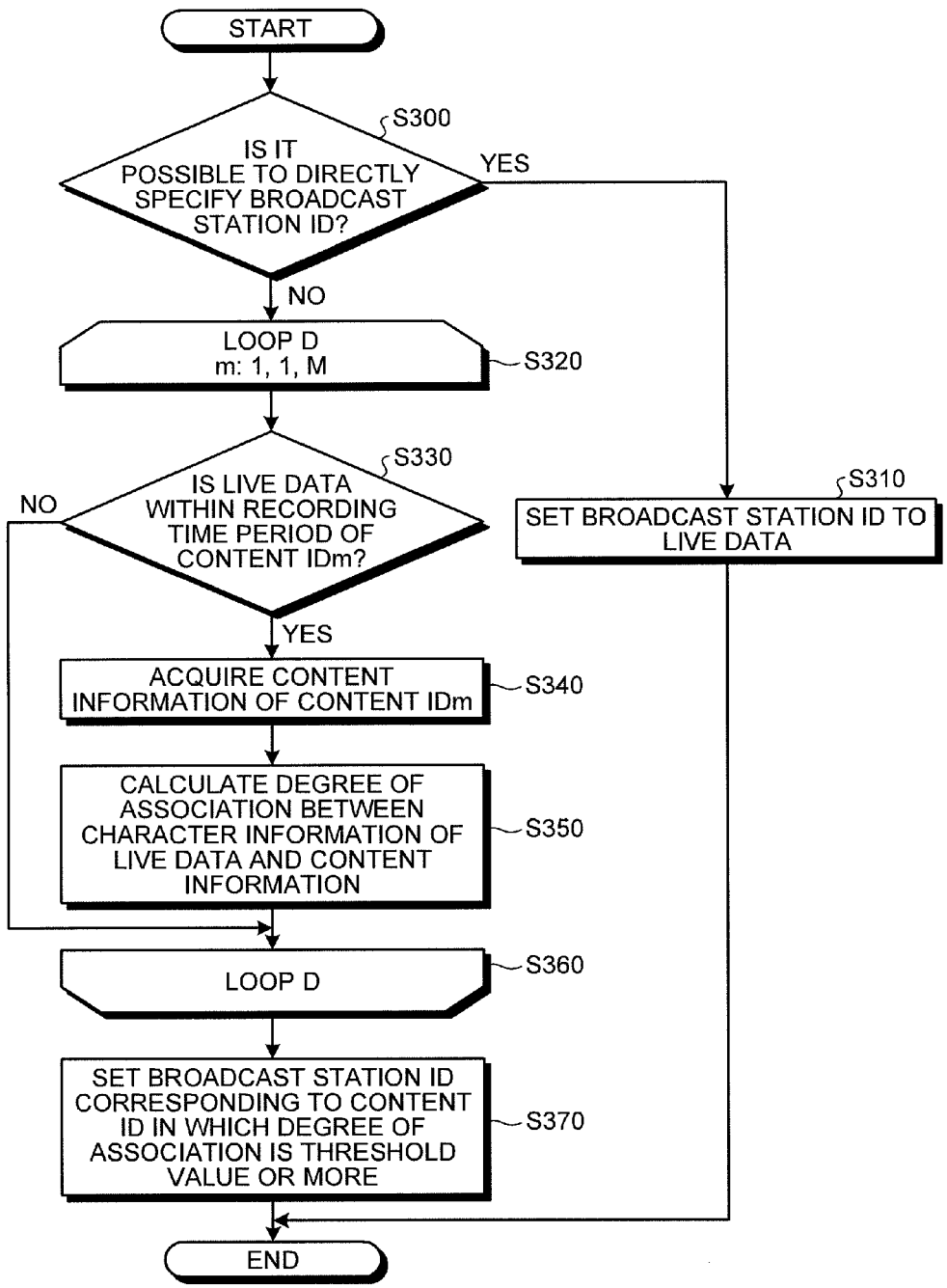
FIG. 16 is a flowchart illustrating the flow of a process in a broadcast station identifying unit according to the second embodiment.

The broadcast station identifying unit 50A discerns to which broadcast content of the broadcast station the live data refers based on the character information of the live data received by the live data acquiring unit 40, and associates the live data with the broadcast station ID. The process flow of the broadcast station identifying unit 50A will be described with reference to a flowchart illustrated in FIG. 16.

First, the broadcast station identifying unit 50A determines whether or not a character string matching with a broadcast station name, a broadcast station short name, or a broadcast station tag, which specifies a broadcast station, is included in character information of live data (step S300). Here, when it is determined that the character string is included in the character information of the live data, the process proceeds to step S310, and otherwise, the process proceeds to step S320.

When it is determined that the character string specifying the broadcast station is included in the character information of the live data, the broadcast station identifying unit 50A associates the matching character string with the broadcast station (step S310). This process is the same as the process in the broadcast station identifying unit 50 according to the first embodiment, and a description thereof will be omitted.

When it is determined in step S300 that the character string specifying the broadcast station is not included in the character information of the live data, the broadcast station identifying unit 50A sets M as the number of contents stored in the broadcast content storing unit 22, and performs a loop process until a loop counter m in which an initial value is 1 and an increment is 1 reaches an ending value M on a loop identifier "loop D" (step S320).

Next, the broadcast station identifying unit 50A determines whether or not a posting date and time of live data is included in an time interval between a broadcast starting time and a broadcast ending time of an m-th content ID (hereinafter, referred to as a "content IDm") in the broadcast content storing unit 22 (step S330). For example, in the example of the broadcast content storing unit 22 illustrated in FIG. 6, when the content IDm is the content ID1, the broadcast starting time is 15:00, Nov. 11, 2010, and the broadcast ending time is 16:00, Nov. 11, 2010. It is determined whether or not a posting date and time of live data is included in a time period between 15:00, Nov. 11, 2010 and 16:00, Nov. 11, 2010. Here, when it is determined that the posting date and time of live data is included, the process proceeds to step S340, and when it is determined that the posting date and time of live data is not included, the process proceeds to step S360.

When it is determined in step S330 that the live data is included in a time period of the content IDm, the broadcast station identifying unit 50A acquires content information corresponding to the content IDm from the content information storing unit 24 (step S340).

Next, the broadcast station identifying unit 50A calculates a degree of association with the content IDm based on the acquired content information and the character information of the live data (step S350). The degree of association is calculated such that the character string of the content information is compared with the character string of the character information of the live data, and the degree of association with the content IDm is increased by the length of the character string when there is a matching character string.

For example, in the example of FIG. 15, when the character information of the live data is "今、ハイパーニュースを見ています (HyperNews is currently being viewed)" and the content IDm is the content ID1, since the title of the content ID1 is "ハイパーニュース (HyperNews)," the live data includes the title which is the content information of the content ID1 as a partial character string. In this case, since the length of the character string of "ハイパーニュース (HyperNews)" is eight (8) characters, the degree of association with the content ID1 is increased by eight (8). Further, when the character information of the live data is "今、ハイパーニュースを見ています。日本太郎カッコいい (HyperNews is currently being viewed. Nippon Taro is cool)," the degree of association with the content ID1 is increased by eight (8) by "ハイパーニュース (HyperNews)" of the partial character string as described above, and since "日本太郎 (Nippon Taro)" which is the performer of the content ID1 is also included as the partial character string, the length of the character string of "日本太郎 (Nippon Taro)", that is, four (4), is further added to the degree of association.

The character string comparing process is performed for each type of content information corresponding to the content IDm, and thus the degree of association between the live data and the content IDm is calculated.

A symbol of step S360 represents a loop terminal of the loop identifier "loop D," and when the loop D has satisfied the condition, that is, when the loop counter m has reached the ending value M, the process proceeds to step S370, and otherwise, the process returns to step S320 (step S360).

When the loop ends, the broadcast station identifying unit 50A selects the content ID whose degree of association is a predetermined threshold value or more, and acquires the broadcast station ID associated with the selected content ID with reference to the broadcast content storing unit 22 (step S370). Here, the acquired broadcast station ID is associated with the live data.

The above described process is performed on all of live data acquired by the live data acquiring unit 40 so that the live data can be associated with the broadcast station ID.

The process flow in the broadcast station identifying unit 50A has been described so far. Further, when calculating the degree of association, a weight may be set to each type of content information. For example, when a character string matches with a title, 1.2 times the length of the matching character string may be set, and when a character string matches with a performer, 1.5 times the length of the character string may be set.

Further, when the matching partial character string is smaller than a predetermined length, a threshold value may be set not to increase the degree of association.

Further, morphological analysis may be performed on the character information of the live data, and a comparison may be performed exclusively on nouns.

Further, even when it is determined a character string matches with a synonym or an association word using a synonym dictionary or an association word dictionary, the degree of association may be increased. For example, in the example of FIG. 15, in the case in which the content IDm is the content ID2, when a character string of "買い物 (shopping)" is included in the character information of the live data and "ショッピング (shopping)" is acquired from a synonym dictionary, since the character string matches with the partial character string "ショッピング (shopping)" of the title "ショッピング情報 (shopping information)" of the content ID2, the degree of association between the live data and the content ID2 is increased.

Further, the process performed in the broadcast station identifying unit 50A is not limited to the above process, and any other method may be used so far as the live data can be associated with the content ID.

The segment creation device 2 has been described so far.

According to the segment creation device 2 described above, live data is associated with a broadcast station based on the description of the live data. Thus, since even live data which does not explicitly designate a broadcast station can be used in the present system, a topic segment can be more accurately detected. Further, by increasing the number of pieces of available data, live data matching with more various topic segment keywords increases, and thus various topic segments can be detected.

Third Embodiment

Figure 17:
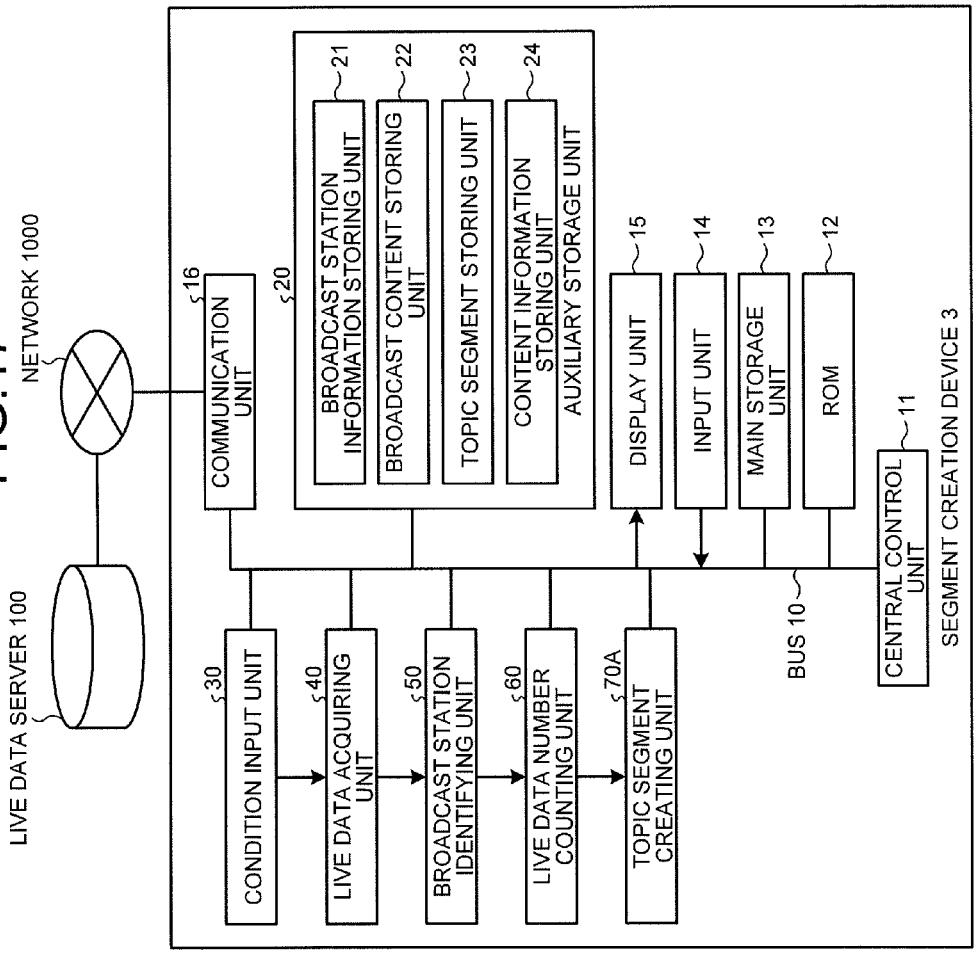
FIG. 17 is a block diagram illustrating a configuration of a segment creation device according to a third embodiment.

FIG. 17 illustrates a configuration of a segment creation device 3 according to a third embodiment of the present invention. The configuration illustrated in FIG. 17 is different from the segment creation device 1 according to the first embodiment illustrated in FIG. 3 in an operation of the topic segment creating unit 70. In this regard, the topic segment creating unit 70 according to the third embodiment is referred to as a topic segment creating unit 70A. The operations by the remaining components excluding the topic segment creating unit 70A are the same as those in the segment creation device 1 illustrated in FIG. 3, and thus a description thereof will be omitted.

The entire system configuration is the same as the system configuration of the first embodiment illustrated in FIG. 2, and thus a description thereof will be omitted. Further, the flow of a process of the segment creation device 3 is the same as the flowchart of the segment creation device 1 illustrated in FIG. 4, and thus a description thereof will be omitted.

Figure 18:
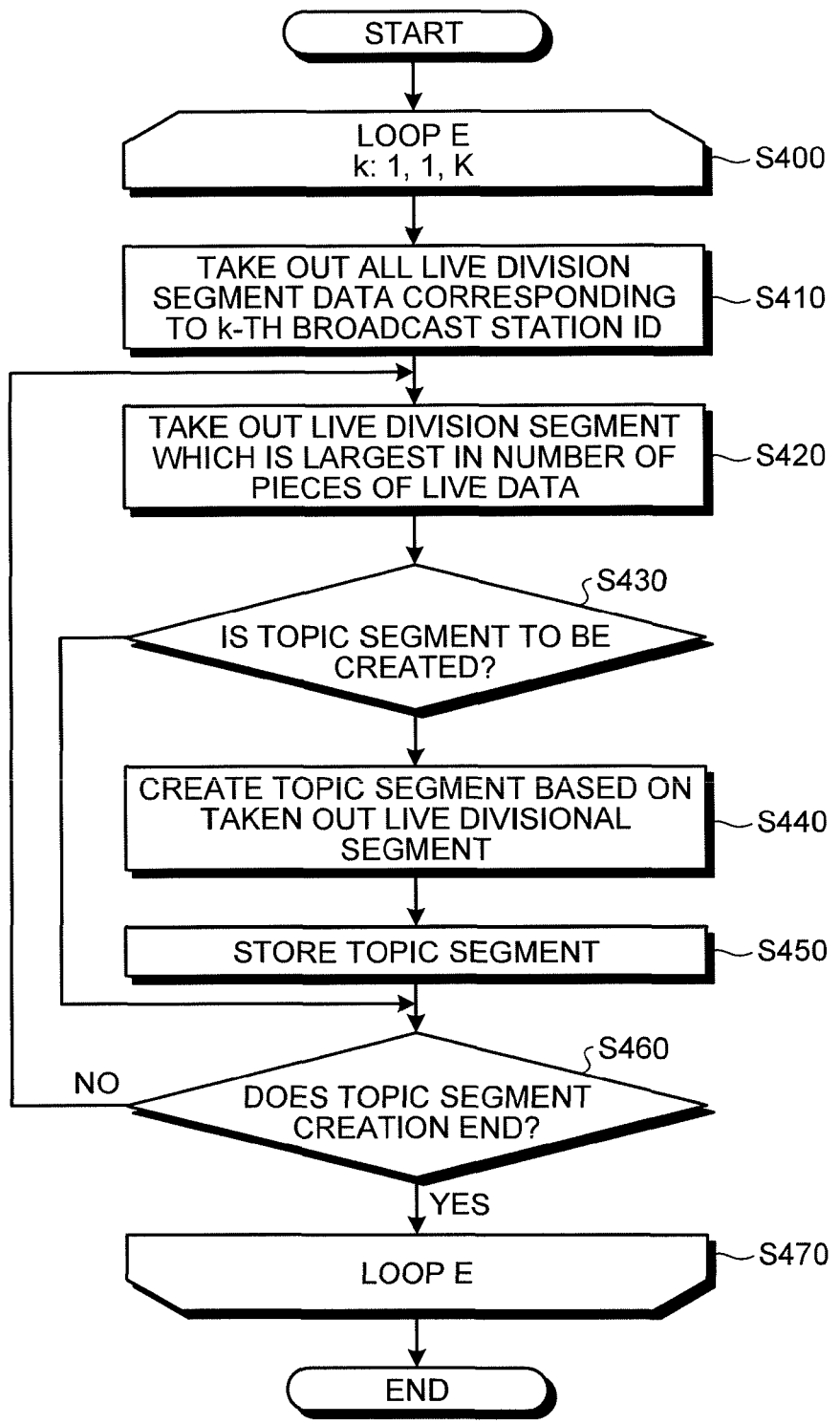
FIG. 18 is a flowchart illustrating the flow of a process in a topic segment creating unit according to the third embodiment.

The topic segment creating unit 70A creates a topic segment centering on a live divisional segment which is large in the number of pieces of live data. The process flow in the topic segment creating unit 70A will be described with reference to a flowchart of FIG. 18.

First, the topic segment creating unit 70A sets K as a total of the number of broadcast station IDs stored in the broadcast station information storing unit 21, and starts a loop operation of a loop identifier "loop E" until a loop counter k in which an initial value is 1 and an increment is 1 reaches an ending value K (step S400).

Next, the topic segment creating unit 70A reads out all live divisional segments corresponding to a k-th broadcast station ID and the number of pieces of live data corresponding to the live divisional segments from the count table created by the live data number counting unit (step S410).

Next, the topic segment creating unit 70A selects a live divisional segment which is the largest in the number of pieces of live data from among the acquired live divisional segments (step S420).

Next, it is determined whether or not a topic segment centering on the live divisional segment selected in step S410 is to be created (step S430). Specifically, when it is determined that the selected live divisional segment overlaps any topic segment created in step S440 which will be described later, the live divisional segment is not used to create the topic segment, and the process proceeds to step S460. However, when it is determined that the live divisional segment does not overlap the topic segment, the process proceeds to step S430.

Figure 19:
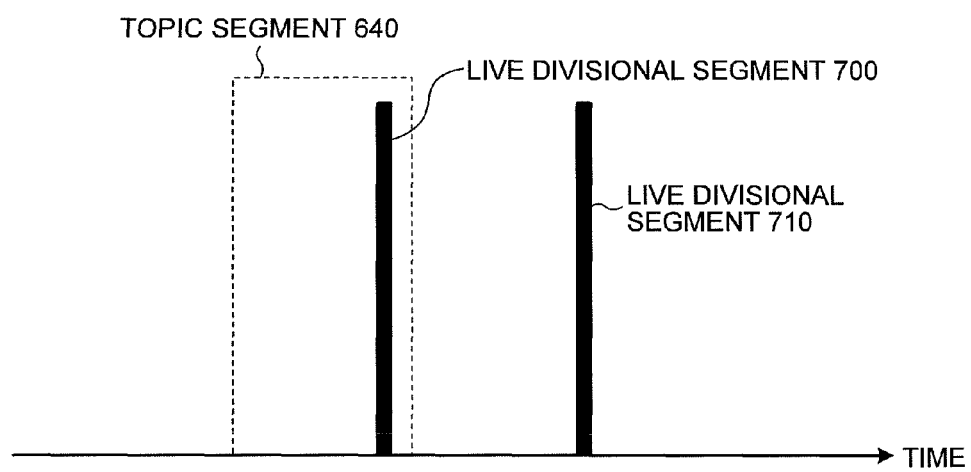
FIG. 19 is a diagram illustrating an example of a relation between a topic segment and a live divisional segment.

The determination process of step S430 will be concretely described with reference to FIG. 19. A topic segment 640 illustrated in FIG. 19 is a topic segment created in step S440. A horizontal axis of FIG. 19 represents a time. Here, when a live divisional segment 700 is assumed to be the live divisional segment selected in step S420, the live divisional segment 700 overlaps the topic segment 640, and thus it is determined that the topic segment is not to be created based on the live divisional segment 700. However, when a live divisional segment 710 is the live divisional segment selected in step S420, the live divisional segment 700 does not overlap the topic segment, and thus it is determined that the topic segment is to be created based on the live divisional segment 710.

Further, even when a maximum value of the number of pieces of live data is less than a predetermined threshold value, the process proceeds to step S450 without creating the topic segment. Further, when a maximum value of the number of pieces of live data is less than a predetermined threshold value, other live divisional segments are obviously less than a predetermined threshold value, and thus the process may proceed to step S470.

When it is determined in step S430 that the topic segment is to be created, the topic segment creating unit 70A creates a topic segment centering on the live divisional segment selected in step S410 (step S440). Specifically, a segment which is added to before and after the live divisional segment by a predetermined time is created as a topic segment. For example, when the live divisional segment is 15:00 to 15:05, Nov. 11, 2010 and a time to be added to before and after the live divisional segment is 3 minutes, the created topic segment is 14:57 to 15:08, Nov. 11, 2010. Further, a predetermined time to be increased may be set by a designer in advance. In the time to be added, an addition value to be added to before the live divisional segment may be different from an addition value to be added to after the live divisional segment. Further, the additional value may be set to zero (0), and thus the live divisional segment may be created as the topic segment as it is. Further, a negative value may be used as the addition value.

Next, topic segment data is created by combining the topic segment created in step S440, the k-th broadcast station ID, and the topic segment keyword, and then stored in the topic segment storing unit 23 (step S450).

Next, the topic segment creating unit 70A determines whether or not the process of creating the topic segment in the k-th broadcast station ID has ended (step S460). Here, it is determined whether or not the number of created topic segments corresponding to the k-th broadcast station ID is a predetermined number or more. When it is determined that the number of created topic segments is a predetermined number or more, the process proceeds to step S470. Further, even when all of the live divisional segment data corresponding to the k-th broadcast station ID is read, the process proceeds to step S470. In any other cases, the process returns to step S420.

Next, the topic segment creating unit 70A determines whether or not the loop E has ended (step S470). When it is determined that the loop E has satisfied the ending condition, the topic segment creating unit 70A ends the process of creating the topic segment. However, when it is determined that the loop E has not satisfied the ending condition, the process returns to step S400 and is repeated.

The topic segment creating unit 70A has been described so far. The topic segment creating unit 70A can create the topic segment centering on a peak of the number of pieces of live data. When the number of topic segments to be created is set to 1, the topic segment may be created based on only a maximum value of the number of pieces of live data.

Further, when it is determined in step S430 that the live divisional segment overlaps the previously created topic segment, the topic segment is not created. However, the topic segment may be created even on the live divisional segment, and then the created topic segment may be combined with the overlapping topic segment to be integrated into one topic segment.

The segment creation device 3 has been described so far. Further, the broadcast station identifying unit 50A of the segment creation device 2 may be used instead of the broadcast station identifying unit 50 of the segment creation device 3.

In the first to third embodiments, digital content has been described as an example of content, and the present invention can be applied to analog content. Further, television broadcast content has been described as an example of broadcast content, but the present invention can be applied to radio broadcast content.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A segment creation device, comprising:
a live data acquiring unit that is configured to acquire, using at least one of a processor or a programmable logic device, character string data transmitted from a plurality of terminals, and that is configured to acquire live data that includes the character string data and a data registration date and time which is a date and time at which the character string data is acquired;
wherein the live data further includes a broadcast station ID of a broadcast station related to the character string data;
a condition input unit that is configured to accept from a user a search condition input, using at least one of a processor or a programmable logic device, the search condition input including i) time zone information representing a predetermined time zone and ii) character string information;
a broadcast station information storing unit that is configured to store a broadcast station ID, the broadcast station ID serving as an identifier uniquely identifying a broadcast station in combination with one or more broadcast station tags which are character strings representing a broadcast station;
a content information storing unit that is configured to store the broadcast station ID and content information which is bibliographic information of broadcast content;
a broadcast station identifying unit that is configured to i) acquire a search string entered by an input device, and live data having character string data corresponding to the search string, ii) compare the character string data of acquired live data with the content information having the broadcasting time and date including the registration date and time of the live data, and iii) select a broadcast station ID corresponding to content information in which a degree of association between the character string data of the live data and the content information is greater than or equal to a predetermined value;
a live data number counting unit that is configured to count, using at least one of a processor or a programmable logic device, the number of pieces of live data having character string data which is included in the predetermined time zone and match with the character string information at intervals of a predetermined unit time, or count the number of pieces of live data at intervals of the unit time for each broadcast station ID related to the live data; and
a segment creating unit that is configured to, using at least one of a processor or a programmable logic device, i) specify a first period in which the number of pieces of live data counted by the live data number counting unit is equal to or greater than a predetermined threshold value, ii) detect a second period that includes a plurality of consecutive first periods, and iii) create segment data which includes a starting date and time and an ending date and time of the second period or a length of the second period.

2. The segment creation device according to claim 1, further comprising
a broadcast content storing unit that is configured to store a content ID serving as an identifier uniquely identifying broadcast content; and
a content information storing unit that is configured to store the content ID and content information which is bibliographic information of broadcast content,
wherein the live data further includes a content ID related to the character string data,
wherein the live data number counting unit is configured to count the number of pieces of live data at intervals of the unit time for each content ID related to the live data,
wherein the segment creating unit is configured to specify a first period in which the number of pieces of live data of each content ID counted by the live data number counting unit is equal to or greater than a predetermined threshold value, and
wherein the broadcast station identifying unit is configured to select a content ID corresponding to content information in which a degree of association between the character string data of the live data and the content information is greater than or equal to predetermined value.

3. The segment creation device according to claim 1,
wherein the segment creating unit is configured to calculate a mean value and a standard deviation of the number of pieces of live data counted by the live data number counting unit, and calculate the threshold value based on the mean value and the standard deviation.

4. A segment creation method, comprising
acquiring, using at least one of a processor or a programmable logic device, character string data transmitted from a plurality of terminals, and acquiring live data that includes the character string data and a data registration date and time which is a date and time at which the character string data is acquired;
wherein the live data further includes a broadcast station ID of a broadcast station related to the character string data;
accepting, using at least one of a processor or a programmable logic device, a search condition input from a user, the search condition input including i) time zone information representing a predetermined time zone and ii) character string information;
storing a broadcast station ID, the broadcast station ID serving as an identifier uniquely identifying a broadcast station in combination with one or more broadcast station tags which are character strings representing a broadcast station;
storing the broadcast station ID and content information which is bibliographic information of broadcast content;

i) acquiring, using at least one of a processor or a programmable logic device, a search string entered by an input device, and live data having character string data corresponding to the search string, ii) comparing, using at least one of a processor or a programmable logic device, the character string data of acquired live data with the content information having the broadcasting time and date including the registration date and time of the live data, and iii) selecting, using at least one of a processor or a programmable logic device, a broadcast station ID corresponding to content information in which a degree of association between the character string data of the live data and the content information is greater than or equal to a predetermined value;

counting, using at least one of a processor or a programmable logic device, the number of pieces of live data having character string data which is included in the predetermined time zone and matches with the character string information at intervals of a predetermined unit time, or counting the number of pieces of live data at intervals of the unit time for each broadcast station ID related to the live data; and creating, using at least one of a processor or a programmable logic device, segment data by i) specifying a first period in which the counted number of pieces of live data is equal to or greater than a predetermined threshold value, ii) detecting a second period that includes a plurality of consecutive first periods, and iii) creating the segment data including a starting date and time and an ending date and time of the second period or a length of the second period.

5. A computer program product comprising a non-transitory computer usable medium having computer readable program codes embodied in the medium causing a computer to execute:

acquiring, using at least one of a processor or a programmable logic device, character string data transmitted from a plurality of terminals, and acquiring live data that includes the character string data and a data registration date and time which is a date and time at which the character string data is acquired;

wherein the live data further includes a broadcast station ID of a broadcast station related to the character string data;

accepting, using at least one of a processor or a programmable logic device, a search condition input from a user, the search condition input including i) time zone information representing a predetermined time zone and ii) character string information;

storing a broadcast station ID, the broadcast station ID serving as an identifier uniquely identifying a broadcast station in combination with one or more broadcast station tags which are character strings representing a broadcast station;

storing the broadcast station ID and content information which is bibliographic information of broadcast content;

i) acquiring, using at least one of a processor or a programmable logic device, a search string entered by an input device, and live data having character string data corresponding to the search string, ii) comparing, using at least one of a processor or a programmable logic device, the character string data of acquired live data with the content information having the broadcasting time and date including the registration date and time of the live data, and iii) selecting, using at least one of a processor or a programmable logic device, a broadcast station ID corresponding to content information in which a degree of association between the character string data of the live data and the content information is greater than or equal to a predetermined value;

counting, using at least one of a processor or a programmable logic device, the number of pieces of live data having character string data which is included in the predetermined time zone and matches with the character string information at intervals of a predetermined unit time, or counting the number of pieces of live data at intervals of the unit time for each broadcast station ID related to the live data; and creating, using at least one of a processor or a programmable logic device, segment data by i) specifying a first period in which the counted number of pieces of live data is equal to or greater than a predetermined threshold value, ii) detecting a second period that includes a plurality of consecutive first periods, and iii) creating the segment data including a starting date and time and an ending date and time of the second period or a length of the second period.

* * * * *